(12) United States Patent
Auslander et al.

(10) Patent No.: US 8,026,306 B2
(45) Date of Patent: Sep. 27, 2011

(54) RED-LUMINESCENT INK JET PRINTING COMPOSITIONS AND METHODS FOR IMPROVED WATERFASTNESS

(75) Inventors: Judith D. Auslander, Westport, CT (US); John Griffiths, Garforth (GB); Penelope C. Myers, Skipton (GB)

(73) Assignee: Pitney Bowes Inc., Stamford, CT (US)

( * ) Notice: Subject to any disclaimer, the term of this patent is extended or adjusted under 35 U.S.C. 154(b) by 941 days.

(21) Appl. No.: 11/967,642

(22) Filed: Dec. 31, 2007

(65) Prior Publication Data

US 2009/0169747 A1  Jul. 2, 2009

(51) Int. Cl.
*C09D 11/10* (2006.01)
*C08K 3/10* (2006.01)
(52) U.S. Cl. ........ 524/403; 524/548; 524/606; 524/612; 526/258; 526/259; 526/260; 523/160; 347/100
(58) Field of Classification Search .................. 523/160; 347/100; 526/258, 259, 260; 524/403, 548, 524/606, 612
See application file for complete search history.

(56) References Cited

U.S. PATENT DOCUMENTS

| | | | | |
|---|---|---|---|---|
| 3,296,105 | A * | 1/1967 | Rushmere | 205/307 |
| 3,501,447 | A * | 3/1970 | Gustav et al. | 525/340 |
| 5,371,160 | A * | 12/1994 | Crowe et al. | 526/263 |
| 6,391,995 | B2 * | 5/2002 | Murugan et al. | 526/265 |

OTHER PUBLICATIONS

Okamoto et al. Macromolecules 1998, 31, 9201-9205.*
Perebar Report at http://www.perebar.bam.de/PereOpen/PerebarFrameset-0.htm, Feb. 2003.*
Tamikado et al. Die Makromolekulare Chemie 1961, 50(1), 244-252.*

* cited by examiner

*Primary Examiner* — David W Wu
*Assistant Examiner* — Vu A Nguyen
(74) *Attorney, Agent, or Firm* — George M. Macdonald; Charles R. Malandra, Jr.; Steven J. Shapiro

(57) ABSTRACT

Described are compositions and methods effective to improve the security obtainable for red phosphorescent inks printed, such as by ink jet printing. Specially designed polymeric chelating agents are water soluble and have a high chelating efficiency for lanthanide cations and are themselves strongly adsorbed on polymeric substrates, especially paper. The polymeric chelating agents comprise a polymer chain of either general formulae (1) or (2) containing pyridine-N-oxide, quinoline-N-oxide or isoquinoline-N oxide pendent ligand groups A, where m and n are independent integers in the range of from 1 to 10, and the number average molecular weight of the polymers lies in the range from $1 \times 10^3$ to $5 \times 10^5$:

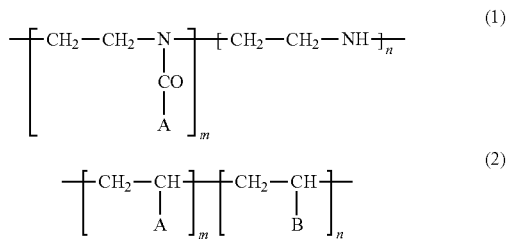

In one aspect a polymeric chelate as described is produced in situ in an aqueous ink formulation and is subsequently printed onto a substrate and dried. In another, a substrate is pretreated with a chelate as described and dried, and then subsequently printed with an aqueous solution of a fluorescent rare earth salt. In both cases, the result is a wet-fast, intensely luminescent print.

14 Claims, 3 Drawing Sheets

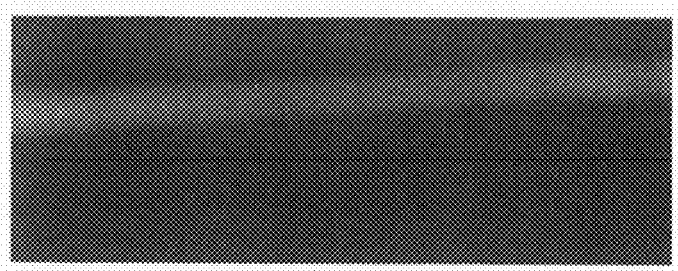

FIG. 1a

RED FLUORESCENCE OF A LINE AQUEOUS EU (III) SALT SOLUTION APPLIED TO A NON-FLUORESCENT PAPER THAT HAS BEEN PRE-TREATED WITH POLYMER 1, VIEWED UNDER UV LIGHT.

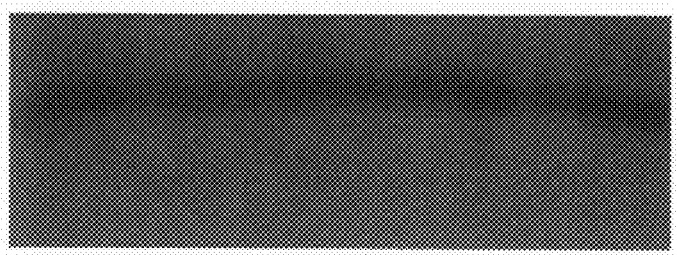

FIG. 1b

A LINE OF AQUEOUS EU (III) SALT SOLUTION APPLIED TO UNTREATED NON-FLUORESCENT PAPER SHOWING NO FLUORESCENCE UNDER UV LIGHT

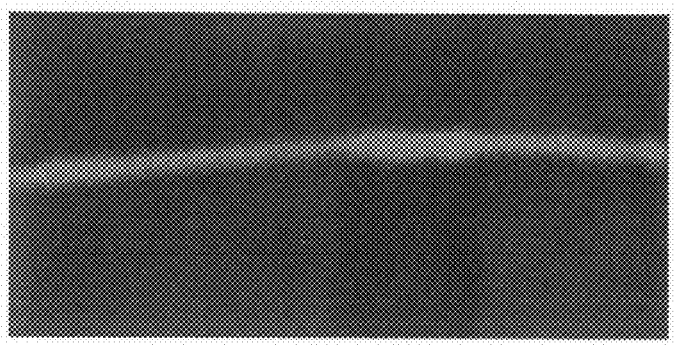

FIG. 1c

SAMPLE 1a IN WHICH A SEGMENT OF THE LINE HAS BEEN WASHED DOWN WITH WATER. NO FLUORESCENCE LOSS OCCURS FROM THE TREATED AREA, AND THERE IS MINIMAL SPREADING OF THE LINE.

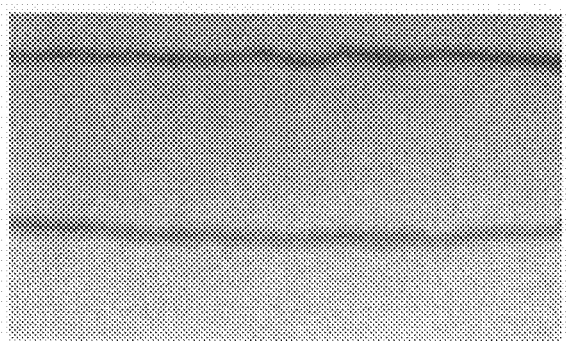

FIG. 2a
LINES OF MIXED AQUEOUS EU (III) SALT AND POLYMER I APPLIED TO UNTREATED OPTICALLY BRIGHTENED PAPER, SHOWING UNDER UV EXPOSURE RED FLUORESCENT LINES AGAINST A BLUE FLUORESCENT BACKGROUND.

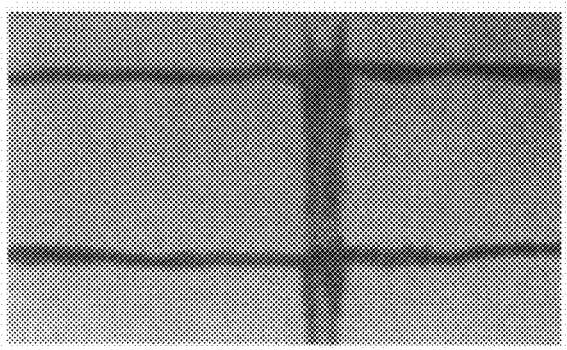

FIG. 2b
SAMPLE 2a, IN WHICH A SEGMENT OF THE LINES HAS BEEN WASHED DOWNWARDS WITH WATER, SHOWS THAT NO FLUORESCENCE LOSS OCCURS FROM THE WASHED AREAS OF THE RED FLUORESCENT LINES AND THAT THERE IS MINIMAL SPREADING OF THE LINES.

RED FLUORESCENCE OF A LINE OF AQUEOUS EU (III) SALT SOLUTION APPLIED TO A NON-FLUORESCENT PAPER THAT HAS BEEN PRE-TREATED WITH POLYMER II, VIEWED UNDER UV LIGHT.

PREVIOUS SAMPLE IN FIG. 3a IN WHICH A SEGMENT OF THE LINE HAS BEEN WASHED DOWN WITH WATER. NO FLUORESCENCE LOSS OCCURS FROM THE TREATED AREA, AND THERE IS MINIMAL SPREADING OF THE LINE.

RED-LUMINESCENT INK JET PRINTING COMPOSITIONS AND METHODS FOR IMPROVED WATERFASTNESS

FIELD OF THE INVENTION

The invention disclosed herein relates generally to ink jet printing methods and compositions for providing red-luminescent images with improved waterfastness.

BACKGROUND OF THE INVENTION

It has been a common problem that water-based inks generally have poor water-fastness. Their solubility in water makes them effective as ink jet inks but this same property lessens their effectiveness in security systems.

While some red-luminescent inks provide particularly effective security features and it would be desirable to utilize them in ink jet printing devices, improvements are necessary to give them more fastness in the presence of water.

The art has provided a number of very interesting security inks based on lanthanide metal compounds and has developed a variety of security systems employing them. For example, In U.S. Pat. No. 5,837,042, Lent, et al., describe invisible fluorescent jet inks said to be suitable for producing security markings on documents and other articles. The jet ink compositions comprise a fluorescent colorant, an ink carrier, and optionally one or more binder resins. The markings are invisible to the unaided eye and are visible only when excited by ultraviolet light. The colorant comprises a rare earth metal and a chelating ligand, is excitable by ultraviolet light having a wavelength of from about 275 nm to about 400 nm, and fluoresces at a wavelength of from about 550 nm to about 700 nm, with the proviso that when the rare earth metal is europium, dysprosium, or terbium, the chelating ligand is not dibenzoylmethane. Also described is a method of identifying objects comprising providing a security marking as described above, exciting the marking and reading the fluorescent emission.

In another, U.S. Pat. No. 6,902,265, Critelli, et al., describe a method for printing high-information-density, machine-readable composite images. They teach printing machine-readable light-colored or invisible, but luminescent, postage-evidencing symbology and dark, other readable postage information, preferably in a single print operation, to provide large amounts of information without diminishing read rates. The resulting combination image can be printed independent of substrate material to enable the provision of a high information density without obscuring any one component. The postage-evidencing symbology is printed in large-format and can include redundant information within an IBI image or between an IBI and visible dark image for a variety of practical purposes. In a preferred form, the images are printed using conventional ink jet printers using water-based inks. In one embodiment of this type, the images are printed with a conventional two-cartridge color ink jet printer by printing postage-evidencing symbology with a single-color ink and printing the visible dark image as a composite dark color from a standard multi-color cartridge. Europium-containing inks can be utilized.

In U.S. Pat. No. 6,905,538 to Auslander, there are described water-based invisible red fluorescent inks provide machine-readable, inverse contrast invisible images and can be printed using conventional ink jet printers. The inks employ rare earth complexed ligand fluorophores having narrow excitation and emission spectra. In one embodiment the images are printed with an ink comprising water and a water-soluble organic fluorescent fluorophore, which when printed and dried on paper, is invisible to the eye and fluoresces in the green to infrared range, e.g., from about 550 to 1200 nm, when irradiated with short wave length UV radiation, e.g., from 230 nm to 280 nm. The highly specific excitation and emission rates, coupled with a high inverse contrast on papers of all colors, makes them particularly useful as ink jet inks for postal and other purposes.

In all of these and other cases of security inks, it is important that images printed with the inks retain their functionality if wetted by rain, spilled liquids or other common causes of wetness. Unfortunately, the factors which make inks easy to print with by ink jet printing, generally detract from the important property of water fastness.

There is a need for postal and security inks with strong fluorescent signals that can be printed by ink jet printing to produce images having a high degree of water fastness.

SUMMARY OF THE INVENTION

It is an object of the present invention to improve the security obtainable for red phosphorescent inks printed by ink jet printing.

This invention provides new syntheses for and uses of Europium organic chelates which exhibit high water fastness.

The present invention utilizes specially designed polymeric chelating agents which are water soluble, have a high chelating efficiency for lanthanide cations and are themselves strongly adsorbed on polymeric substrates, especially paper.

The invention provides methods and compositions for producing water-resistant red-luminescent prints on paper using polymeric water soluble Eu(III) chelates.

In one aspect, the invention provides polymeric chelating agents, which comprise a polymer chain of either general formulae (1) or (2) containing pyridine-N-oxide, quinoline-N-oxide or isoquinoline-N oxide pendent ligand groups A, where m and n are independent integers in the range of from 1 to 10, and the number average molecular weight of the polymers lies in the range from $1 \times 10^3$ to $5 \times 10^5$:

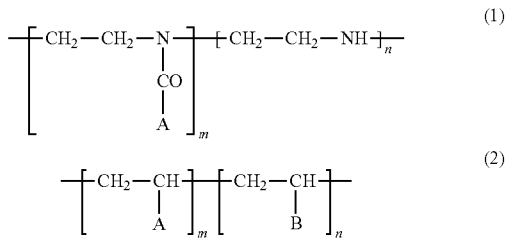

wherein each pendent group A in formulae (1) and (2) is a member selected from the group consisting of

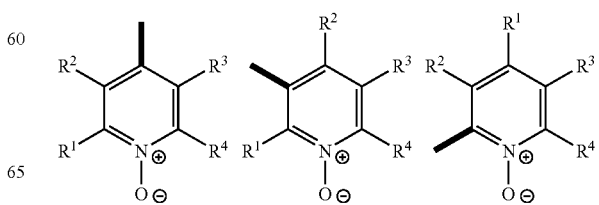

-continued

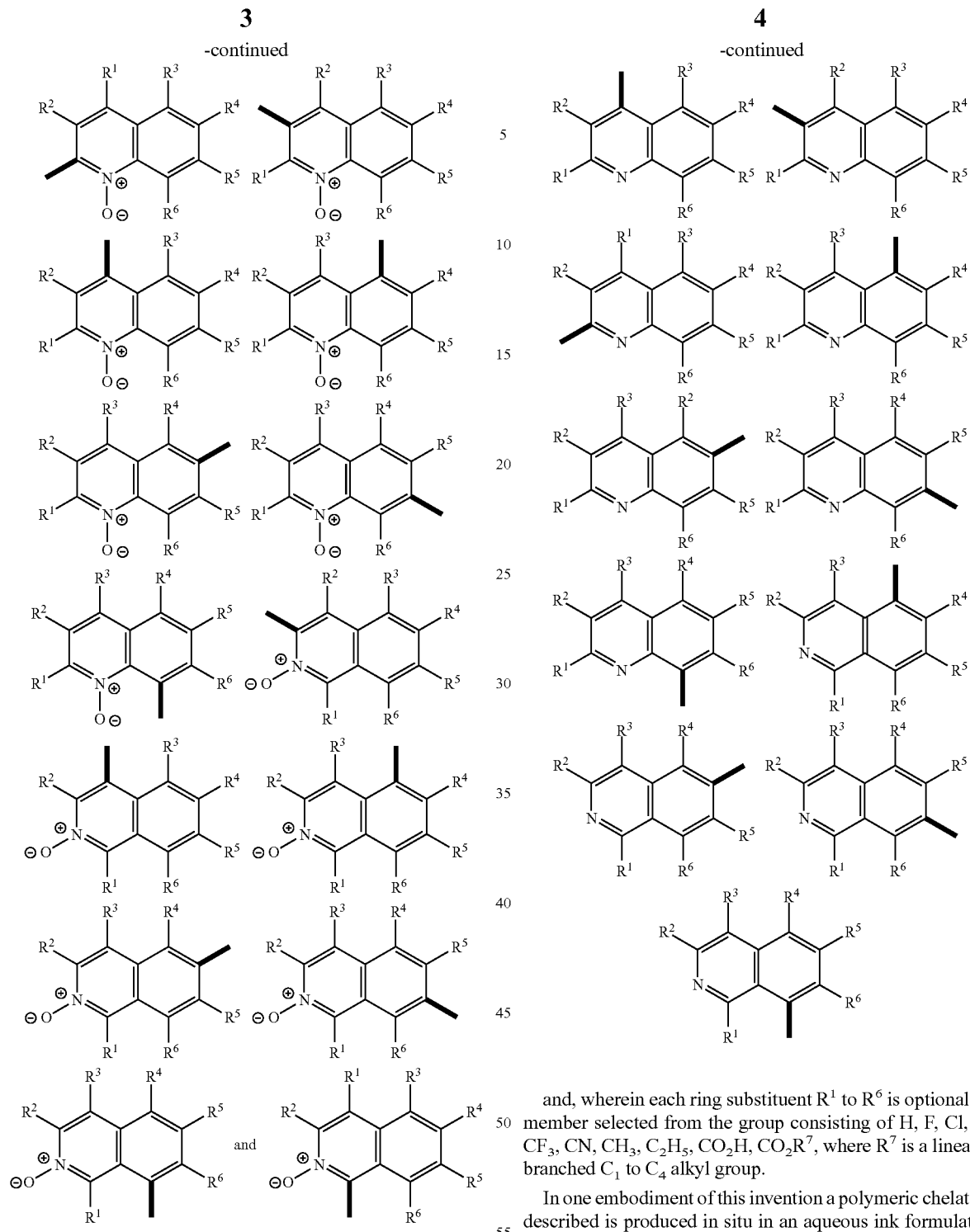

and, wherein each side chain B in formula (2) is a member selected from the group consisting of

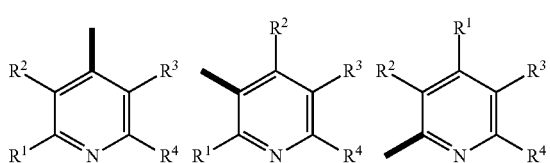

and, wherein each ring substituent $R^1$ to $R^6$ is optionally a member selected from the group consisting of H, F, Cl, Br, $CF_3$, CN, $CH_3$, $C_2H_5$, $CO_2H$, $CO_2R^7$, where $R^7$ is a linear or branched $C_1$ to $C_4$ alkyl group.

In one embodiment of this invention a polymeric chelate as described is produced in situ in an aqueous ink formulation and is subsequently printed onto a substrate and dried to give a wet fast, intensely luminescent print.

In another embodiment, a substrate is pre-treated with a chelate as described and dried, and then subsequently printed with an aqueous solution of a fluorescent rare earth salt to generate the wet-fast, luminescent complex in situ.

In other aspects, the invention provides methods for preparing the polymeric chelates as described by procedures set out in detail below.

Other preferred features and advantages are described below.

DESCRIPTION OF THE DRAWINGS

The invention will be better understood and its advantages will become more apparent from the following description, especially when read in light of the accompanying drawing, wherein:

FIG. 1a is a photograph showing red fluorescence under ultraviolet light from a line of aqueous Eu (III) salt solution applied to a non-fluorescent paper that has been pre-treated with a chelating agent according to the invention.

FIG. 1b is a photograph showing no fluorescence under ultraviolet light from a line of aqueous Eu (III) salt solution applied to untreated non-fluorescent paper.

FIG. 1c is a photograph of a wetted paper as in FIG. 1a showing no loss of fluorescence and minimal migration of the original mark.

FIG. 2a is a photograph of a paper showing red fluorescence under ultraviolet light from a line of mixed aqueous Eu(III) salt and polymeric chelating agent of the invention solution applied to untreated optically brightened paper and dried.

FIG. 2b is a photograph of a wetted paper as in FIG. 2a showing no loss of fluorescence and minimal migration of the original mark.

DETAILED DESCRIPTION OF THE INVENTION

Figure 3A:
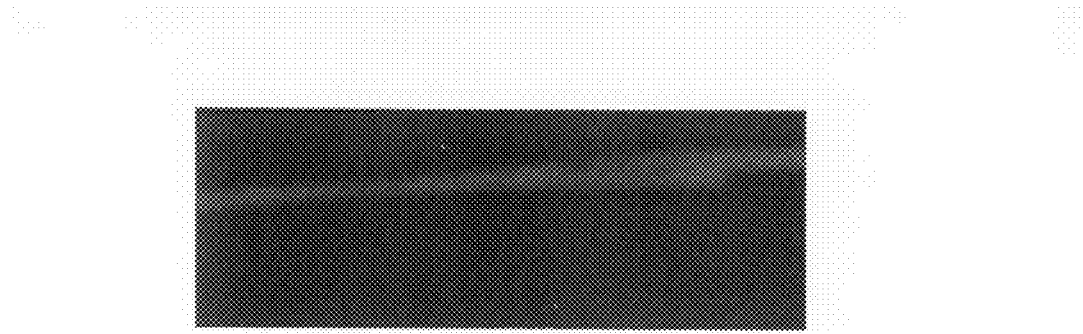
FIG. 3a is a photograph of a paper prepared as in FIG. 1, but using an alternate polymer of the invention.

In describing the present invention, reference will be made to the drawings, briefly described above, which will aid in illustrating the advantages of the invention.

The polymeric chelating agents according to the invention contain pyridine-N-oxide, quinoline-N-oxide or isoquinoline-N oxide pendent ligand groups A, which are linked to form polymer chains of the general formulae (1) and (2), where m and n are independent integers in the range 1 to 10, and the number average molecular weight of the polymer lies in the range from about $1 \times 10^3$ to about $5 \times 10^5$.

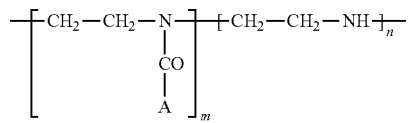

Formula (1)

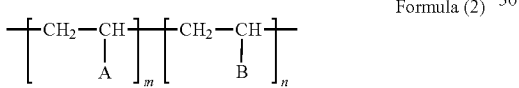

Formula (2)

The pendent groups A in formulae (1) and (2) may be any of the following

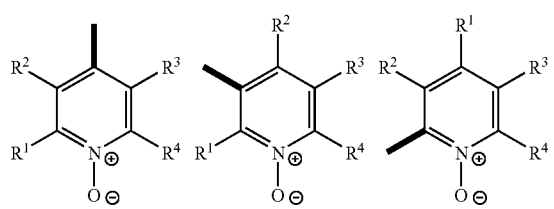

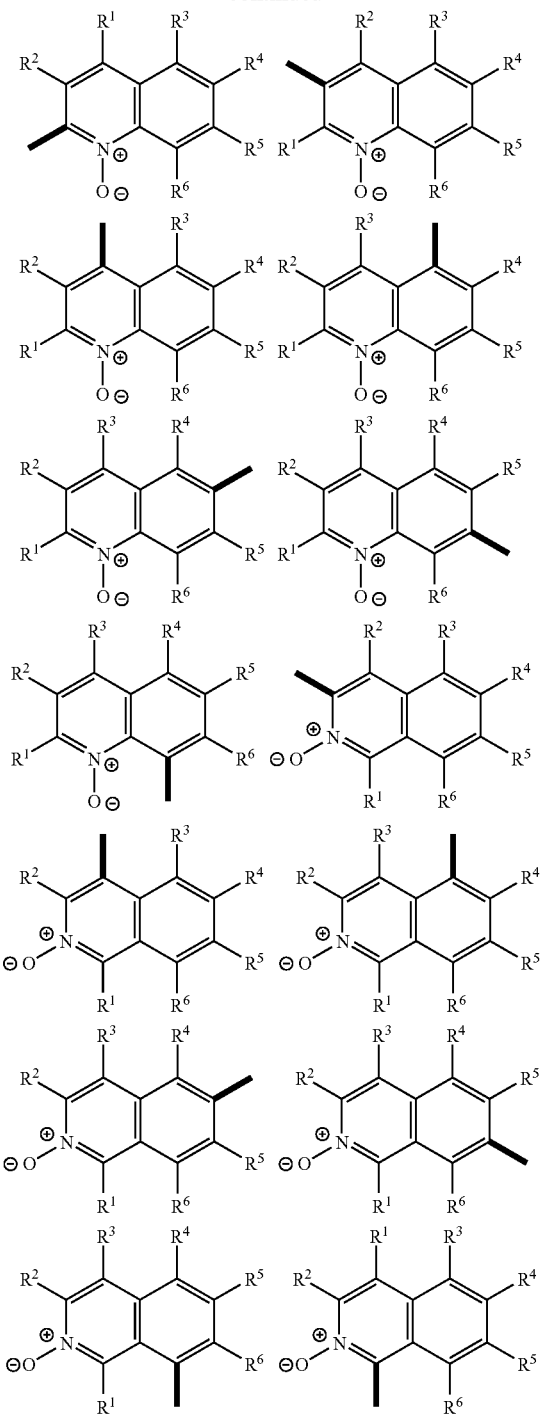

And the side chains B in Formula (2) may be any of the following:

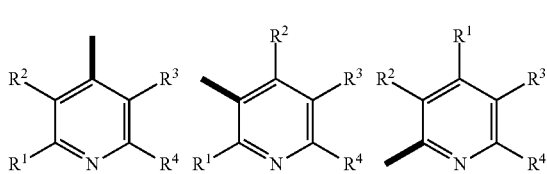

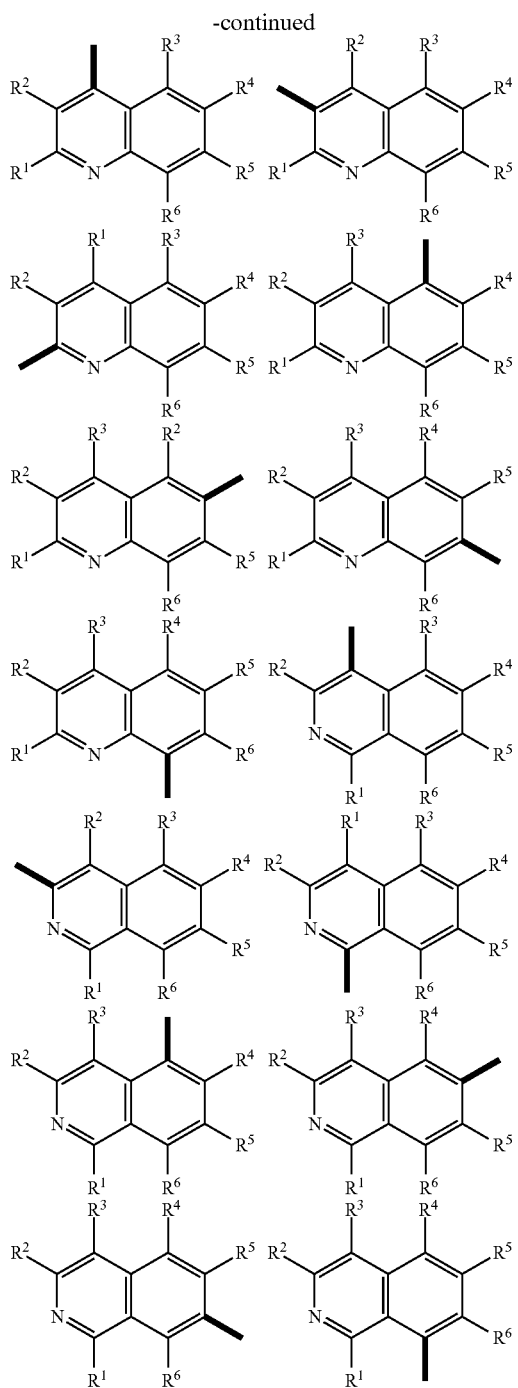

The ring substituents $R^1$ to $R^6$ are optionally H, F, Cl, Br, $CF_3$, CN, $CH_3$, $C_2H_5$, $CO_2H$, $CO_2R^7$, where $R^7$ is a linear or branched $C_1$ to $C_4$ alkyl group.

The polymers represented by Formulae (1) and (2) are neutral and water soluble, and may be used in this form. Alternatively, any of these polymers may be rendered positively charged by addition of dilute acids, when the amino, pyridine, quinolone or isoquinoline groups become protonated. This further increases water solubility and also increases the affinity of the polymer for cellulosic substrates such as paper. Among the appropriate acids for this purpose are acetic, hydrochloric, sulfuric, nitric, phosphoric and perchloric acids.

A polymeric chelating agent as above, will enhance the wet fastness of salts of rare earth compounds, particularly of the lanthanide series, especially europium and terbium, e.g., Eu (III). The preferred europium salts are Eu(III) chloride, bromide, nitrate, sulphate, although any water soluble Eu(III) salt may be used, as may any water soluble hexacoordinated Eu(III) chelate.

In one embodiment of the invention, a solution of a polymer of formula (1) or (2) in water or a mixture of water and water-miscible organic solvents, with or without the addition of dilute acids, is applied to a suitable substrate, such as paper or a polymeric material, and dried. The paper or other substrate is then printed with an aqueous solution of a rare earth salt or complex, e.g., of europium or terbium, preferably of europium as a Eu(III) salt or hexacoordinate Eu(III) complex, and allowed to dry naturally in air. The resultant prints are colorless in daylight but are revealed as intense red fluorescent marks when viewed under ultraviolet light. The prints are very resistant to removal or bleeding on contact with water.

In another embodiment of this invention, a solution is prepared containing a polymer of formula (1) or (2) and a rare earth salt or complex, preferably Eu(III) salt or Eu(III) hexacoordinated complex, in water or a mixture of water and water-miscible organic solvents, with or without added acid, such that there is an excess of N-oxide groups relative to Eu(III) cations. The resultant colorless solution may be applied, e.g., by printing, such as by ink jet printing onto paper or other type of polymeric substrate and the print allowed to dry naturally in air. The resultant print is colorless in daylight but intensely red fluorescent when viewed under ultraviolet light. The print also shows excellent resistance to removal or bleeding on contact with water. This makes prints made according to the invention very effective for security purposes.

The solution prepared containing a polymer of formula (1) or (2) and a rare earth salt or complex, preferably Eu(III) salt or Eu(III) hexacoordinated complex, in water or a mixture of water and water-miscible organic solvents, can be formulated as an ink suitable for ink jet printing. Inks according to the invention for use as ink jet inks are desirably stable chemically in aqueous solution and have effective viscosity and surface tension characteristics to assure satisfactory operation of the designated type of ink jet printer. Printers can be of the piezoelectric or bubble type. The viscosity of the liquid inks used in current piezoelectric inkjet printers is typically from 1.5 to 20 centipose (cps) and in the thermal ink jet printer is lower, e.g., from 1 to 5 cps. The desirable surface tension of liquid ink jet printer inks will typically be between 30-45 dynes/cm.

The inks will comprise a water-soluble rare earth metal salt or complex comprised which when printed and dried on paper can be visible or invisible to the eye at the concentrations employed and fluoresces when irradiated with short wave length UV radiation, e.g., from 230 nm to 280 nm. For the purposes of this description, the fluorescent component can be referred to herein as a fluorophore because it is not a pigment in the true sense of imparting a color to the substrate on which it is printed—it is preferably invisible or virtually so. In addition, the inks preferably include various materials to aid in fluorophore dispersion, paper penetration and drying in effective amounts for these purposes, particularly in inks suitable for ink jet printing. Among these materials are polar solvents, surface active agents, humectants, and the like. Each of the components will be incorporated in an amount effective to provide an ink with viscosity and surface tension properties effective for ink jet or other printing.

Among the polar solvents are triethylene glycol mono butyl ether (BTG), tripropylene n-butyl ether, diethylene glycol monobutyl ether, diethylene glycol methyl ether, dipropylene glycol methyl ether, tripropylene glycol methyl ether and other glycol ethers. Among other things, these solvents are employed in amounts effective to facilitate rapid penetration of the ink into a paper substrate. In some cases, they also inhibit microbiological growth, an advantage in aqueous systems.

Among the surface active agents are anionic surfactants such as sodium alkyl sulfonates, cationic surfactants such as cetyl trimethylammonium bromide, zwifterionic surfactants such as sulfobetaines, and non ionic surfactants such as alkyl polyethylene oxides (e.g., available as Igepals), non-ionic acetylenic diol surfactants (e.g., surfinols), etc. Among other things, the surface active agents are employed in amounts effective to facilitate uniform dispersion of ingredients through contact with a paper substrate and drying.

Among the humectants and organic water soluble solvents are 2-pyrrolidone, polyethylene glycol (PEG), glycerine, triethylene glycol, ethylene, glycol, propylene glycol, diethylene glycol and other water-soluble polyhydric alcohols. Among other things, these humectants are employed in amounts effective to inhibit loss of solvent and consequent precipitation of fluorophore or buildup of solids on print mechanisms, facilitate penetration of the ink into a paper substrate and/or control drying. In some cases they also inhibit microbiological growth in aqueous systems.

Suitable fluorophores will have very narrow excitation and emission bandwidths. Preferably, the fluorophore is only excited by short UV radiation (e.g., 230 nm-280 nm) and under long UV radiation a print made from it remains invisible.

Polymers of formula (1) may be prepared by reacting poly (ethyleneimine) with the appropriate acid chloride RCOCl, or with the corresponding acid $RCO_2H$ or ester RCOOAlkyl, using any standard method described in the literature to effect attachment of the group R to the polymer backbone via an amide linkage.

Polymers of formula (2) are prepared by partial N-oxidation of the heterocyclic side chains in poly(vinyl) polymers containing the repeat unit (3), where B has the meaning defined previously and the integer p is such that the number average molecular weight of the polymer lies in the range of from about $1\times10^3$ to about $5\times10^5$.

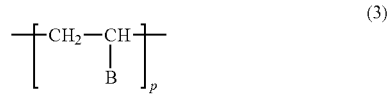

(3)

The following examples are presented to further illustrate and explain the invention and are not to be taken as limiting in any regard. Unless otherwise indicated, all parts and percentages are by weight.

EXAMPLE 1

Synthesis of Polymer I is accomplished according to the following series of reactions.

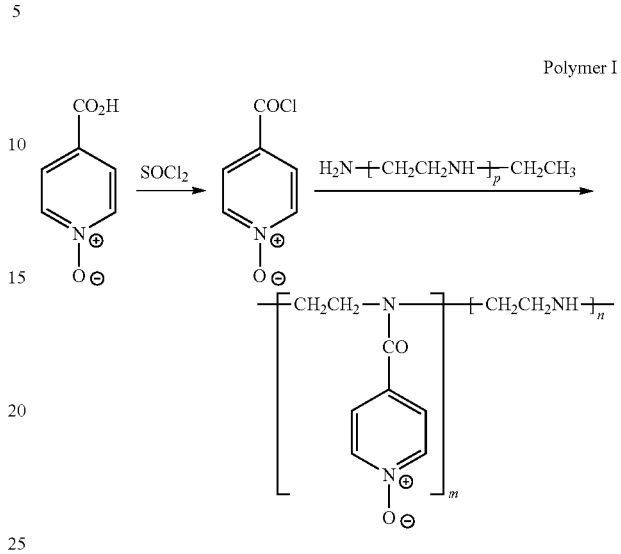

Polymer I

In the first stage, the isonicotinoyl chloride N-oxide is synthesized by first carefully adding isonicotinic acid (5 g) to thionyl chloride (15 ml) in a 50 ml conical flask. The resulting admixture is heated under reflux until no evolution of HCl can be detected at the top of the condenser with ammonia. The resulting solution is cooled, transferred to a pre-weighed 50 ml round bottomed flask, and then the excess thionyl chloride is removed on a rotary evaporator under fume extraction. The product, isonicotinoyl chloride N-oxide, a white powder (7.92 g), is kept in a desiccator under vacuum.

In the second stage, isonicotinoyl chloride N-oxide is reacted with poly(ethyleneimine) as follows. The isonicotinoyl chloride N-oxide (7.9 g) is dispersed in dry acetone and refluxed for 10 minutes. The resulting suspension is cooled to 50° C. and a solution of polyethyleneimine (2 g; $M_n$=420) dissolved in dry acetone (100 ml) is added dropwise over 20 minutes while maintaining the temperature at 50° C. The white dispersion changes to pale yellow. The mixture is then refluxed for 20 minutes and cooled, and the acetone is removed by rotary evaporation under vacuum, giving Polymer I as a light orange solid, readily soluble in water. The molecular weight was not measured, but the number average molecular weight (MN) is estimated at about 1600 based on the fact that it is known that the original polyethyleneimine polymer has an average of 9.76 repeat units and assuming more or less complete reaction between the each repeat unit and isonicotinoyl chloride.

EXAMPLE 2

Synthesis of Polymer II is accomplished according to the following reaction.

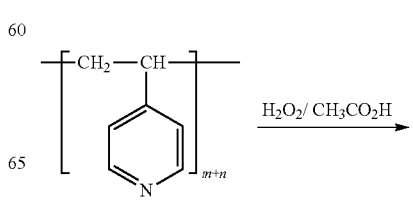

-continued

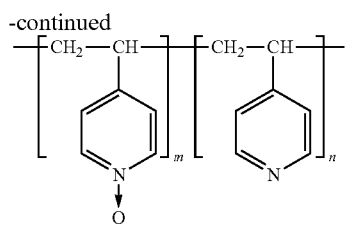

Commercial poly(4-vinylpyridine) (2 g) [$M_N$ 9,500] is dissolved in glacial acetic acid (15 ml) and a 35% aqueous solution of hydrogen peroxide (2 ml) is added. The mixture is heated on a water bath at 70-80° C. for 3 hours, and then further 1.5 ml of hydrogen peroxide is added and heating is continued for 4 hours. The solvent is removed by rotary evaporation, and the residue dried in a vacuum desiccator, giving Polymer II as a white solid, readily soluble in water. The polymer is characterised by Fourier Transform infrared spectroscopy, when the formation of the N-oxide groups was confirmed by the introduction of a new strong peak at 1275 cm$^{-1}$. Again, molecular weight was not measured, but infrared spectrum suggests at least 50% conversion to N-oxide, so it is inferred that the number average molecular weight lies in the approximate range from about 10,000 to about 10,800.

EXAMPLE 3

According to this example, Polymer I is complexed with Eu$^{3+}$ cations on paper.

Polymer I is first dissolved in water at various concentrations and the solution pH of each is adjusted to 2 with dilute HCl. Non-fluorescent paper is immersed in each of the solutions, then allowed to drain and dry in air at room temperature. Solutions of EuCl$_3$ in water (0.3 M) are then applied to the pretreated paper as thin lines and then air-dried at room temperature. This gives a colourless pattern, invisible in daylight, but intensely red fluorescent when viewed under ultraviolet light (254 nm or 365 nm). FIG. 1$a$ is a photograph of one sample so illuminated. FIG. 1$b$ is a photograph of a similar pattern of EuCl$_3$ solution applied to untreated paper, and shows no detectable fluorescence.

When the paper used for FIG. 1$a$ was were held vertically and water was allowed to diffuse downwards over the fluorescent lines, no loss of fluorescence or bleeding of the fluorescence colour into adjacent areas is discernible (FIG. 1$c$).

EXAMPLE 4

In this example Polymer I and the Eu$^{3+}$ ions are coapplied to normal optically brightened paper.

Solutions of Eu (III) chloride and Polymer I in water are premixed and allowed to stand for a few hours. The clear solutions are then applied in thin lines in the same way as in Example 3, above, on untreated, optically brightened paper, and air dried at room temperature. Under daylight the paper is completely white, whereas under UV light the lines show clearly red luminescence against the light blue background fluorescence of the paper (FIG. 2$a$). Wet fastness testing shows that the fluorescence is not removed and little bleeding occurs (FIG. 2$b$).

EXAMPLE 5

In this example Polymer II is complexed with Eu(III) cations on paper.

Figure 3B:
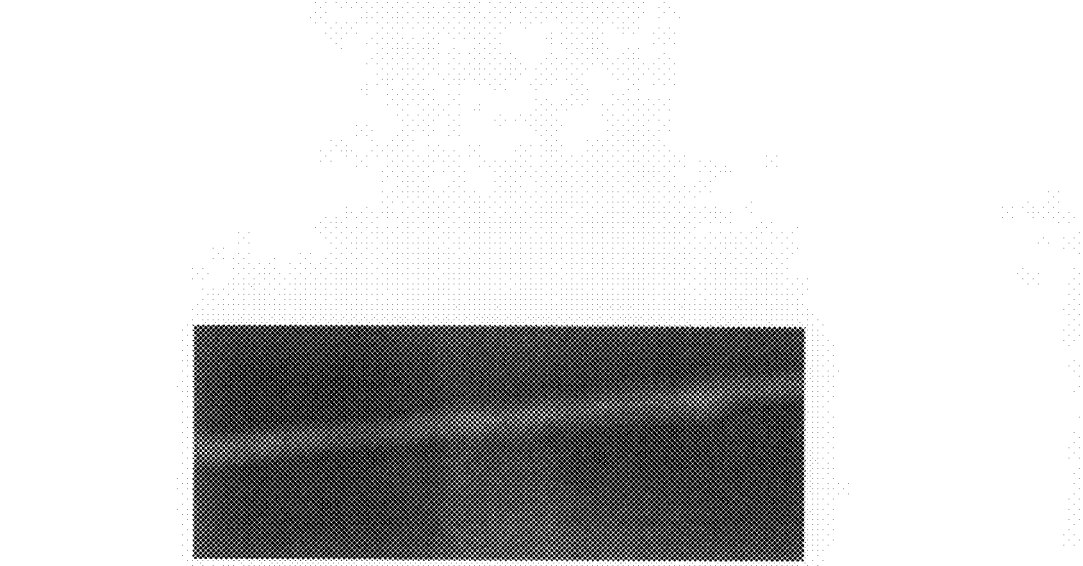
FIG. 3b is a photograph of a wetted paper as in FIG. 3a showing no loss of fluorescence and minimal migration of the original mark.

Non-fluorescent paper is treated with 5% w/v aqueous solution of Polymer II prepared as described in Example 2 and dried in air a 20° C. Solutions of EuCl$_3$ in water (0.3 M) are applied to the pretreated paper as thin lines and then air dried at room temperature. The resultant pattern, invisible in daylight, becomes intensely red fluorescent under ultraviolet light (254 nm or 365 nm) (FIG. 3$a$). Wet-fastness testing, as described previously, shows no significant fluorescence loss or bleeding of the lines (FIG. 3$b$).

EXAMPLE 6

Solutions of Eu (III) chloride and Polymer II in water are premixed and allowed to stand for a few hours. The clear solutions are then applied in the usual way as thin lines on untreated, non-fluorescent paper, and air dried at room temperature. The lines show red luminescence under UV, although the intensity is less than that obtained in Example 5. Wet-fastness testing shows that the fluorescence is not removed and no bleeding occurs.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. A polymeric chelating agent comprising a polymer chain of either general formulae (1) or (2) containing pyridine-N-oxide, quinoline-N-oxide or isoquinoline-N oxide pendent ligand groups A, where m and n are independent integers in the range of from 1 to 10, and the number average molecular weight of the polymers lies in the range from $1 \times 10^3$ to $5 \times 10^5$:

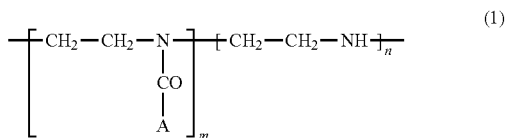

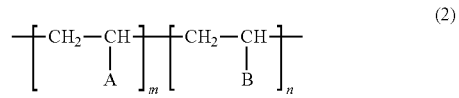

wherein each pendent group A in formulae (1) and (2) is a member selected from the group consisting of

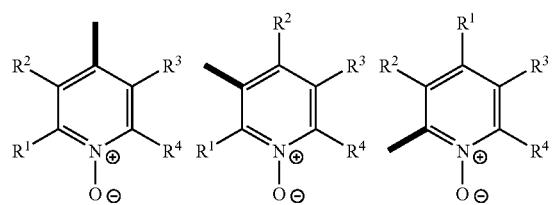

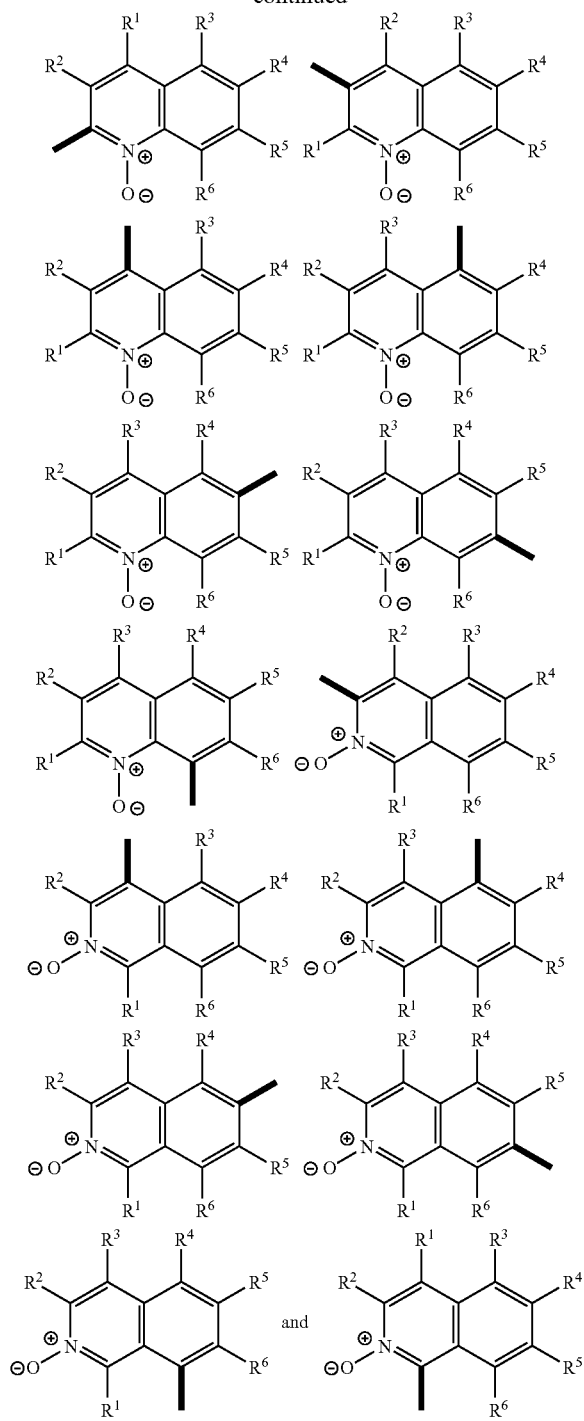

and, wherein each side chain B in formula (2) is a member selected from the group consisting of

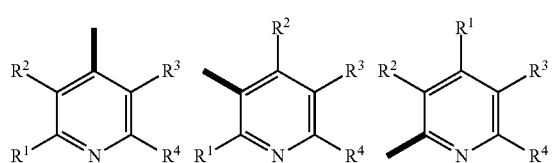

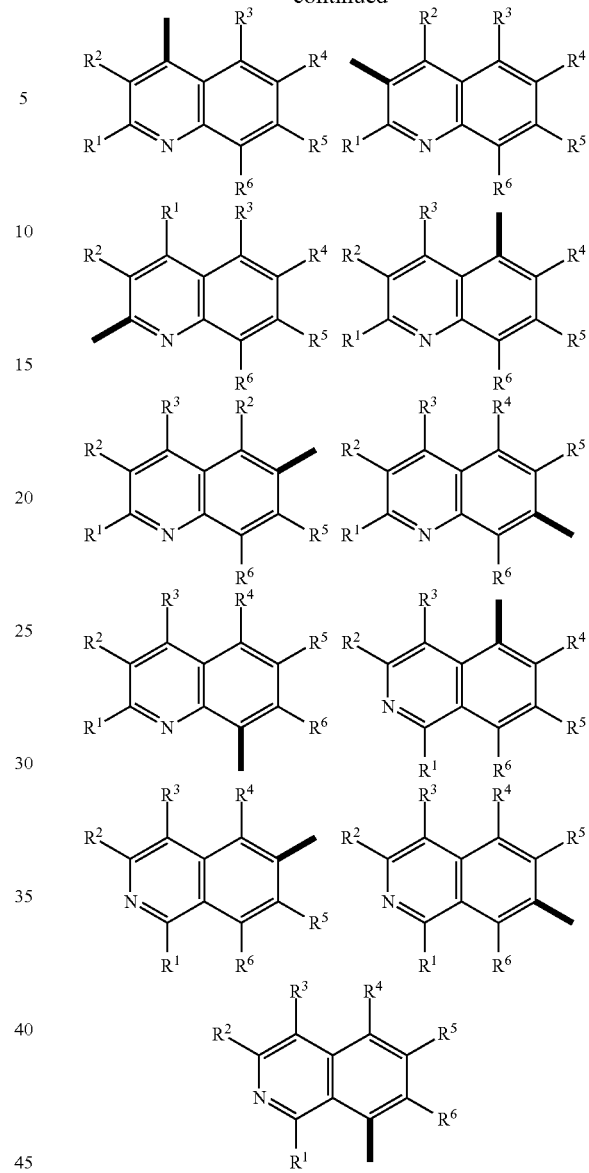

and, wherein each ring substituent $R^1$ to $R^6$ is a member selected from the group consisting of H, F, Cl, Br, $CF_3$, CN, $CH_3$, $C_2H_5$, $CO_2H$ and $CO_2R^7$, where $R^7$ is a linear or branched $C_1$ to $C_4$ alkyl group.

2. The polymeric chelating agent according to claim 1, wherein the polymer is neutral and water soluble.

3. The polymeric chelating agent according to claim 1, wherein the polymer is positively charged and water soluble.

4. The polymeric chelating agent according to claim 1, wherein the polymer comprises a polymer chain of general formulae (1).

5. The polymeric chelating agent according to claim 1, wherein the polymer comprises a polymer chain of general formulae (2).

6. A method for producing water-resistant red-luminescent prints on a substrate, comprising: applying to the substrate, a polymeric chelating agent defined by claim 1 and a red-luminescent rare earth salt or complex.

7. The method according to claim 6, wherein the rare earth salt or complex comprises Eu(III).

8. The method according to claim 6, wherein the polymeric chelating agent is applied to the substrate as an aqueous solution and then the rare earth salt or complex is applied as an aqueous solution to the substrate.

9. The method according to claim 8, wherein the rare earth salt or complex comprises Eu(III).

10. The method according to claim 6, wherein the polymeric chelating agent and the rare earth salt or complex are mixed together and then applied as an aqueous solution to the substrate.

11. The method according to claim 10, wherein the rare earth salt or complex comprises Eu(III).

12. An ink jet ink comprising: a polymeric chelating agent according to claim 1.

13. The ink jet ink according to claim 12, further comprising: a Eu(III) salt or complex, wherein the ink exhibits a viscosity of from 1 to 20 centipose and a surface tension of between 30 and 45 dynes/cm.

14. The ink jet ink according to claim 13, further comprising: polar solvents, surface active agents and humectants.

* * * * *